(12) United States Patent
Wentworth et al.

(10) Patent No.: US 7,784,140 B2
(45) Date of Patent: Aug. 31, 2010

(54) VEHICLE WASH MITTER ASSEMBLY WITH OFFSET RACKS

(75) Inventors: Robert J. Wentworth, Farmington Hills, MI (US); Douglas Calvin, Livonia, MI (US); Michel LeCourt, Westland, MI (US)

(73) Assignee: Motor City Wash Works, Inc., Northville, MI (US)

( * ) Notice: Subject to any disclaimer, the term of this patent is extended or adjusted under 35 U.S.C. 154(b) by 423 days.

(21) Appl. No.: 12/033,068

(22) Filed: Feb. 19, 2008

(65) Prior Publication Data

US 2009/0205149 A1  Aug. 20, 2009

(51) Int. Cl.
B60S 3/04 (2006.01)
(52) U.S. Cl. ...................................... 15/97.3
(58) Field of Classification Search .................. 15/97.3
See application file for complete search history.

(56) References Cited

U.S. PATENT DOCUMENTS

| | | | |
|---|---|---|---|
| 3,499,180 A * | 3/1970 | Hurwitz | 15/97.3 |
| 3,859,686 A | 1/1975 | Breish | |
| 4,096,600 A | 6/1978 | Belanger | |
| 4,164,053 A | 8/1979 | Shelstad | |
| 4,744,122 A | 5/1988 | Beer et al. | |
| 4,937,908 A * | 7/1990 | McCadden | 15/97.3 |
| 5,148,570 A | 9/1992 | Crotts et al. | |
| 5,924,156 A | 7/1999 | Belanger et al. | |
| 6,766,551 B1 | 7/2004 | Kaady et al. | |

* cited by examiner

Primary Examiner—Mark Spisich
(74) Attorney, Agent, or Firm—Dickinson Wright PLLC

(57) ABSTRACT

A vehicle washing system includes an overhead car wash mitter assembly. The assembly includes a pair of side support structures and an overhead supporting structure extending between the side support structures. The overhead supporting structure includes a plurality of rows of racks with each row including a left side rack and a right side rack. The left side racks are moveable together and the right side racks are moveable together and independently of the left side racks. A first gap exists between one of the rows of racks. A second gap exists between another of the rows of racks. The first gap and the second gap are offset laterally from one another with respect to the direction of travel of a vehicle to eliminate any break or gap in cleaning coverage.

25 Claims, 4 Drawing Sheets

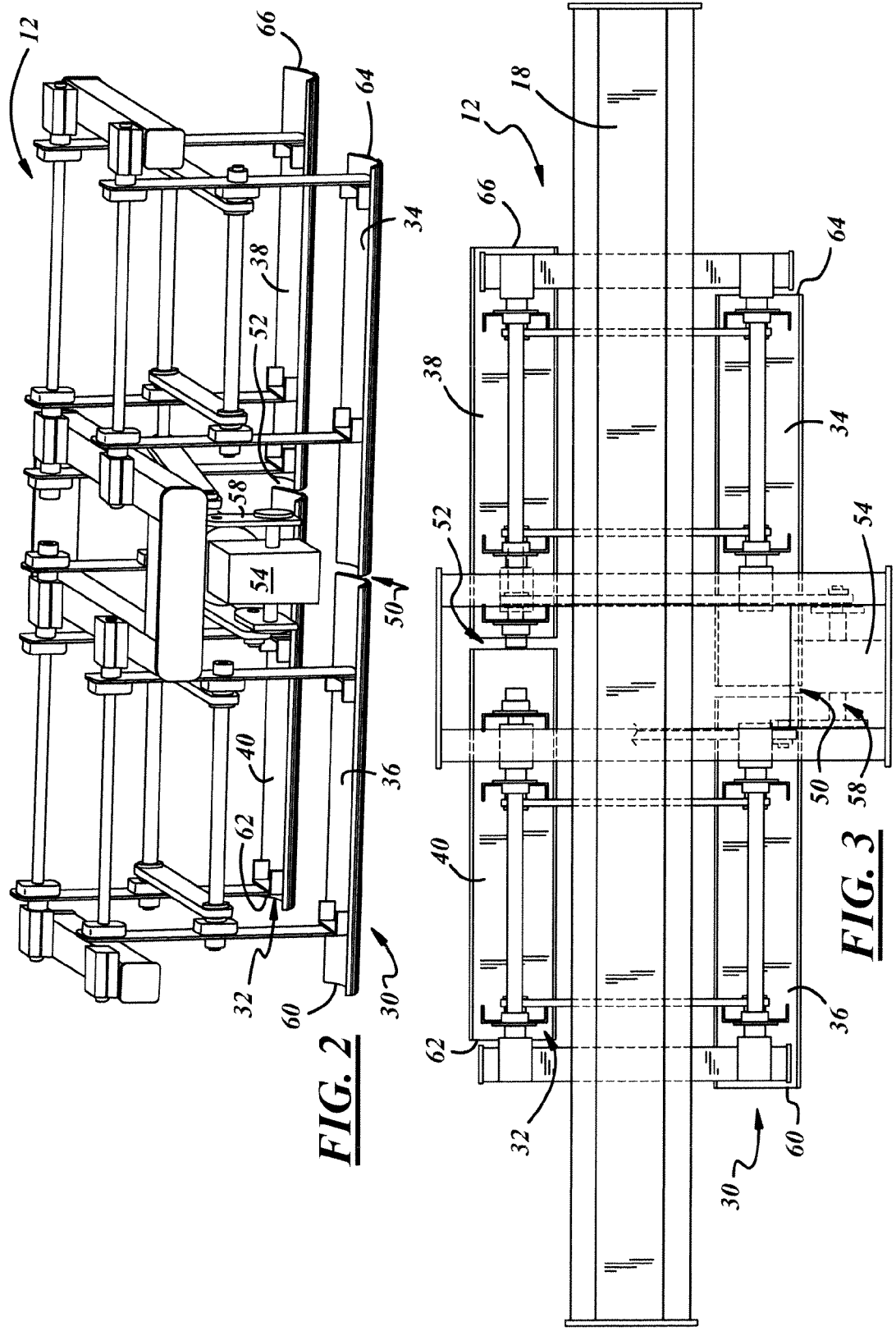

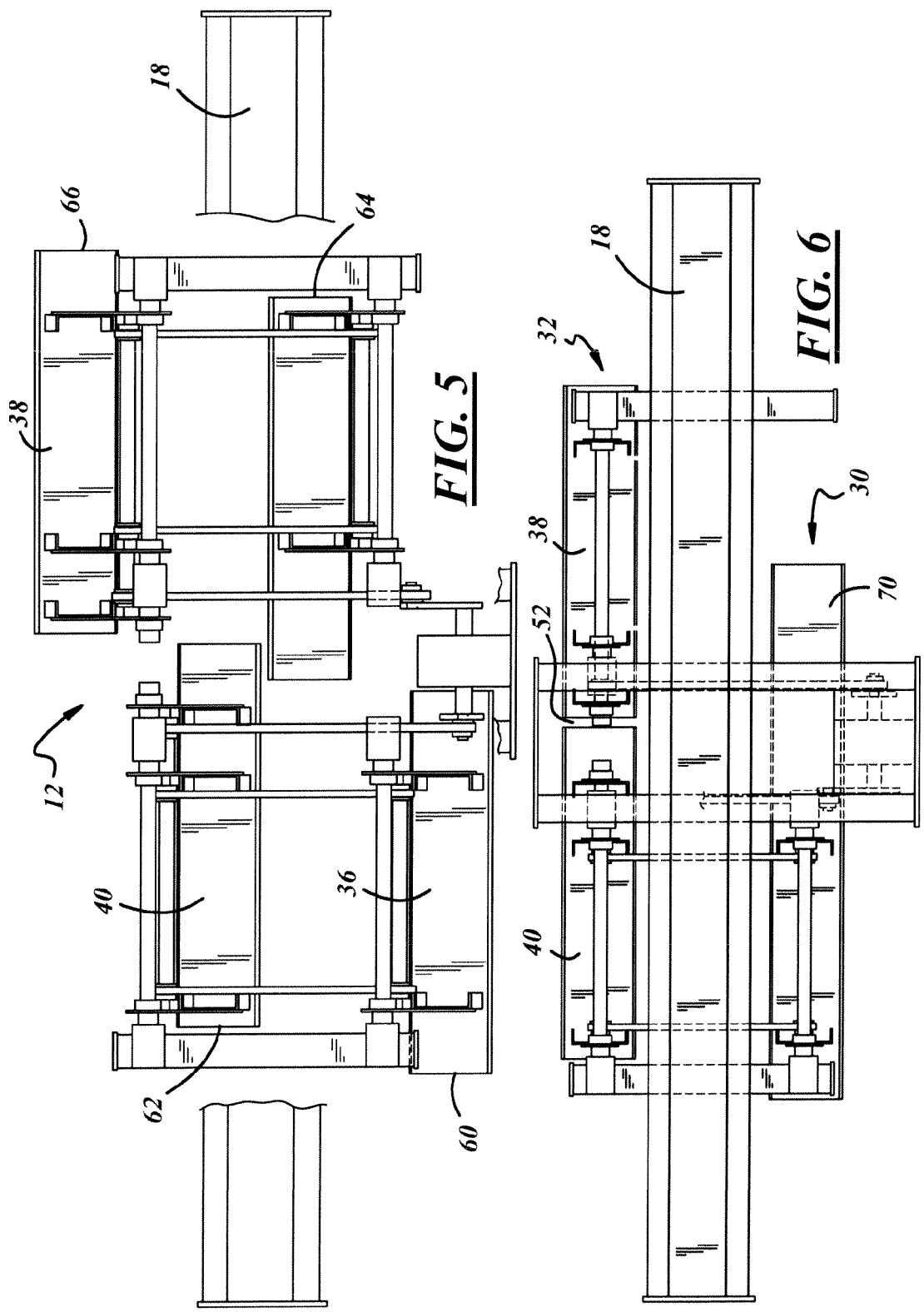

VEHICLE WASH MITTER ASSEMBLY WITH OFFSET RACKS

BACKGROUND OF THE INVENTION

1. Field of the Invention

The present invention relates generally to a vehicle wash mitter assembly. More specifically, the present invention relates to a vehicle wash mitter assembly that provides increased coverage for the top of the vehicle.

2. Description of Related Art

The manufacture, sale, and operation of automotive vehicle washing equipment is big business in the United States and many other countries. The term "automotive vehicle washing", as used herein, refers to wet washing the external surfaces of virtually any type of vehicle from ordinary passenger cars to busses, trucks, vans and even train cars and airplanes.

In the early days, automotive vehicles were washed by hand. The service people who performed this task commercially were equipped with large, spongy mittens or mitts with which they scrubbed the vehicle. As time went on, and mechanized units took over the functions of such personnel, the mechanized units were named "Mitters" because of the analogy of function to the prior manual process.

Such units now are widely employed commercially in various styles and operating designs. Almost universally, they employ a plurality of "mitter curtains" consisting of a wide length of carpeting, heavy fabric, chamois or a plastic material divided into long strips and applied to the vehicle to be washed with a reciprocating or oscillating motion. Although widely used, because of the diversity of the vehicles to which they are applied, the speed with which they are operated, and their reciprocating or oscillating motion, they still suffer from various problems.

While existing "mitter curtains", many of which have different configurations, provide satisfactory performance, they suffer from various disadvantages. One problem attendant to most existing mitter curtains having a pair of side-by-side units is that a gap or space exists between the units, which results in an area of the exterior of the vehicle that is not treated. This area is known in the industry as a "skunk stripe".

SUMMARY OF THE INVENTION

It is therefore an advantage of the present invention to provide an overhead vehicle wash mitter assembly that provides increased coverage over an exterior surface of a vehicle.

It is another advantage of the present invention to provide an overhead vehicle wash mitter assembly that eliminates any "skunk stripe".

It is a further advantage of the present invention to provide an overhead vehicle wash mitter assembly that eliminates any areas of non-coverage or gap in coverage.

In accordance with the above and the other advantages of the present invention, an overhead vehicle wash mitter assembly designed for use in a vehicle wash system is provided. The assembly includes a pair of side supports and an overhead supporting structure extending generally between the pair of side supports. A first row containing at least a left side rack and a right side rack is secured to the overhead supporting structure. A plurality of media are secured to and extending downwardly from each of the left side rack and the right side rack to form mitter curtain assemblies that are intended to contact an exterior of the vehicle. A second row containing at least one rack is secured to the overhead supporting structure. A plurality of media are secured to and extending downwardly from the at least one rack to form a mitter curtain assembly that is intended to contact the exterior of the vehicle. A gap exists between the left side rack and the right said rack of the first row. The at least one rack in the second row is sized and/or positioned such the plurality of media cover any untreated area of the exterior of the vehicle resulting from the gap in the first row. The first row and the second row of racks are reciprocated in a generally forward and rearward direction with respect to a direction of travel of the vehicle.

These and other features and advantages of the present invention will become apparent to one of ordinary skill in the art from the following description of the invention, when viewed in accordance with the accompanying drawings and appended claims.

BRIEF DESCRIPTION OF THE DRAWING(S)

Advantages of the present invention will be readily appreciated as the same becomes better understood by reference to the following detailed description and the accompanying drawings that set forth an exemplary embodiment wherein:

FIG. 2 is a perspective view of an overhead vehicle wash mitter assembly with the overhead supporting structure omitted in accordance with one embodiment of the present invention;

FIG. 3 is a top view of an overhead vehicle wash mitter assembly in accordance with one embodiment of the present invention;

FIG. 5 is a top view of an overhead vehicle wash mitter assembly in a second position in accordance with one embodiment of the present invention; and FIG. 6 is a top view of an overhead vehicle wash mitter assembly in accordance with another embodiment of the present invention.

DETAILED DESCRIPTION OF THE EXEMPLARY EMBODIMENT

Referring to the Figures, a vehicle washing system in accordance with the present invention is illustrated and generally designated by reference number 10. The vehicle washing system 10 includes an overhead mitter assembly 12. In the embodiments shown and described, the mitter assembly 12 is intended to contact an upper surface 22 of a vehicle to effectuate cleaning thereof. However, it will be understood by one of ordinary skill in the art that the mitter assembly 12 can be configured to contact other exterior surfaces of the vehicle other than or in addition to the upper surface of the vehicle. It will also be understood by one of skill in the art that the mitter assembly may be utilized for a variety of different functions in the vehicle washing system.

Figure 1:
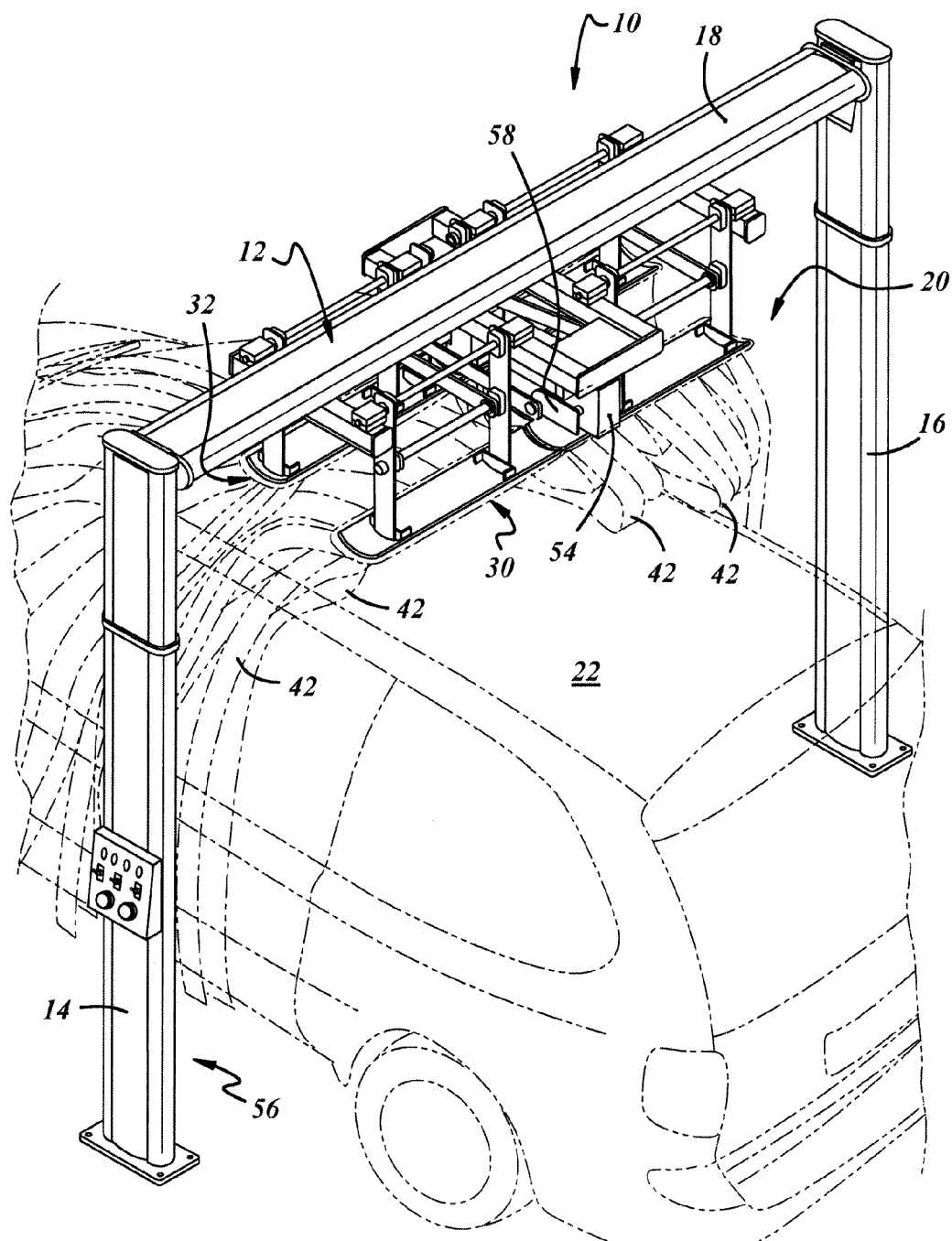
FIG. 1 is a perspective view of an overhead vehicle wash mitter assembly as schematically shown in use in accordance with one embodiment of the present invention.

With reference to FIG. 1, the overhead mitter assembly 12 includes a pair of generally opposing side support sections 14, 16 and an overhead support structure 18. The overhead mitter assembly 12 defines a vehicle bay 20 beneath the overhead support structure 18 and between the side support sections 14, 16 where a vehicle passes during the vehicle washing process. The side support sections 14, 16 are preferably mounted to the floor of the vehicle bay 20, however, they may alternatively be mounted to the walls, ceiling, or other suitable structures. The overhead mitter assembly 12 is illustrated as incorporated into a vehicle washing system where the vehicle moves with respect to the system. However, it will be understood that it may also be incorporated into a system where the vehicle is stationary and the mitter assembly moves with respect to the vehicle.

As shown best in FIGS. 2 and 3, a plurality of racks are secured to the overhead mitter assembly 12. As shown, in one embodiment, the overhead mitter assembly 12 includes a front row of racks 30 and a rear row of racks 32. The front row of racks 30 includes a right side rack 34 and a left side rack 36. The rear row of racks 32 includes a right side rack 38 and a left side rack 40.

Each of the right side racks 34, 38 includes a media secured to each of the racks (FIG. 1). The media preferably consists of a plurality of individual cloth strips 42 that extends downwardly from each of the racks 34, 38 to contact an exterior surface 22 of the vehicle as will be understood by one of ordinary skill in the art. Each of the left side racks 36, 40 include a media secured to each of the racks. The media preferably consist of a plurality of individual cloth strips 42 that extend downwardly from each of the racks 36, 40 to contact the exterior surface of the vehicle. It will be appreciated that while the media preferably consists of a plurality of individual long cloth strips 42 a variety of other suitable media may be utilized, such as plastic, etc.

In one embodiment, the front row of racks 30 are secured to the overhead support structure 18 such that a front gap 50 exists between the right side rack 34 and the left side rack 36. The front gap 50 is oriented generally perpendicular to a direction of travel of the vehicle. The rear row of racks 32 are secured to the overhead support structure 18 such that a rear gap 52 exists between the right side rack 38 and the left side rack 40. The rear gap 52 is also oriented generally perpendicular to the direction of travel of the vehicle. As shown, the front gap 50 and the rear gap 52 are offset from one another in a lateral direction. In other words, the front gap 50 is spaced a different distance from each of the side support sections 14, 16 than the rear gap 52. The front gap 50 and the rear gap 52 are oriented generally parallel to one another. However, it will be understood that the gaps 50, 52 can take on a variety of different configurations and orientations.

The front row of racks 30 and the rear row of racks 32 are in communication with an actuator 54, to cause them to move forwardly and rearwardly with respect to the direction of vehicle travel. The direction of vehicle travel is illustrated generally by the arrow designated 56. The actuator 54 is preferably a motor, such as a hydraulic, electric, or other suitable motor. However, any other suitable actuator can be utilized. The actuator 54 is preferably in communication with a pitman arm 58 to drive or reciprocate the racks. The actuator 54 drives the right side racks 34, 38 separately and independently from the left side racks 36, 40. In other words, the right side racks 34, 38 reciprocate forward and rearward together with respect to the direction of travel of the vehicle. Similarly, the left side racks 36, 40 reciprocate forward and rearward together with respect to the direction of travel of the vehicle.

In one preferred embodiment, the actuator 54 is an electric motor having variable frequency drive, which allows the speed of reciprocation of the racks to be varied as desired. The speed variance is known and can be adjusted by the operator to provide faster or slower reciprocation as desired. Reciprocating the racks at higher speeds tends to clean the exterior of the vehicle better, but it moves more noise. Conversely, reciprocating the racks at lower speeds is quieter, but tends not to clean the vehicle exterior as well.

Figure 4:
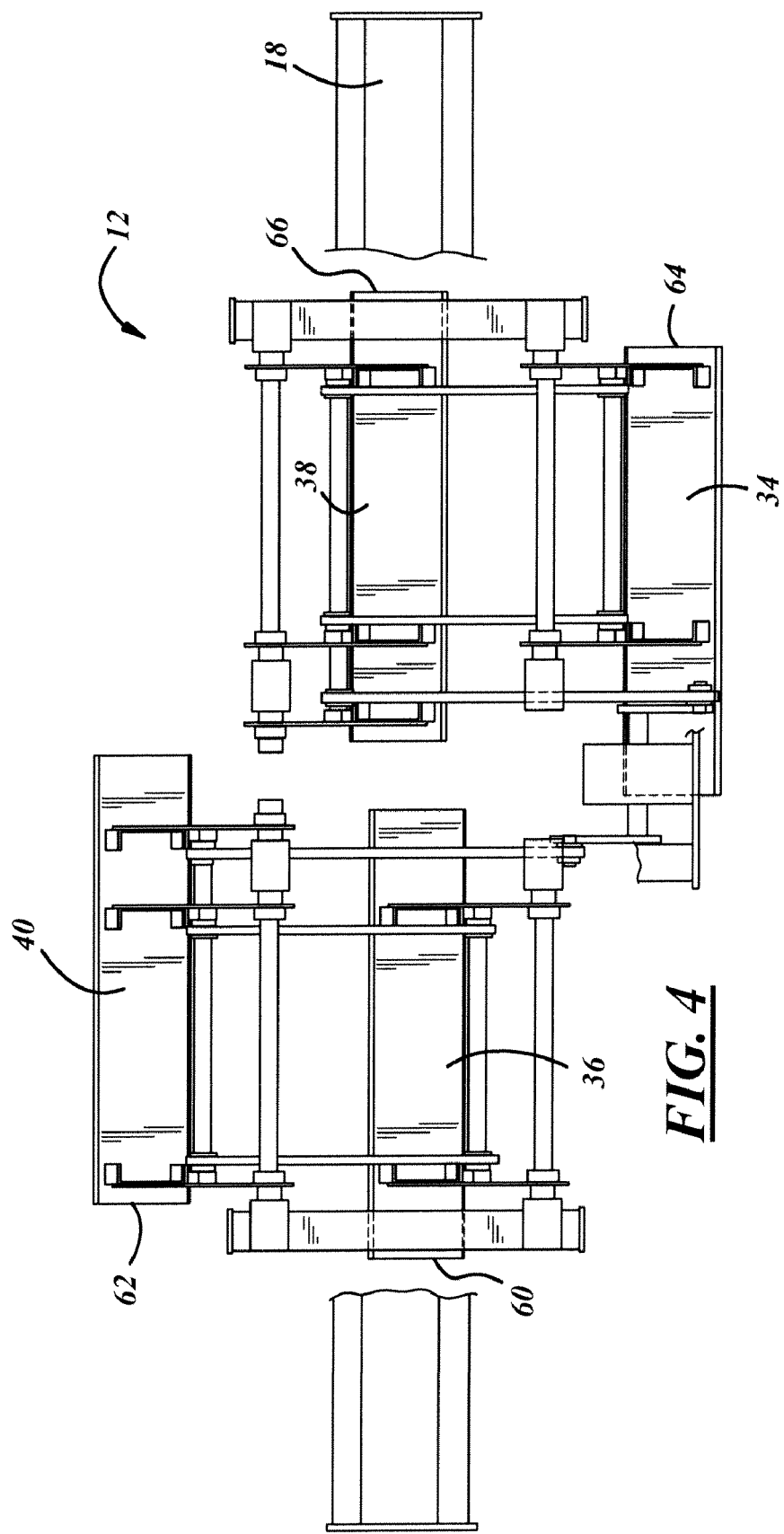
FIG. 4 is a top view of an overhead vehicle wash mitter assembly in a first position in accordance with one embodiment of the present invention.

As shown in FIGS. 4 and 5, the actuator 54 drives the racks such that the right side racks 34, 38 are out of phase with respect to the left side racks 36, 40. Driving the racks out of phase prevents the racks from contacting one another, which would otherwise occur because of the overlapping racks and the offset gaps 50, 52. Further, the racks move forward and rearward in a generally arcuate fashion. Thus, in operation, the lowest point for the media is when the media hangs directly downward. As the racks swing forward, the media swings upward in a generally arcuate fashion. Similarly, when the racks swing rearward, the media swings upward in a generally arcuate fashion. The actuator 54 and pitman arm 58 preferably drive the right side racks 34, 38 such that they are 70 to 90 degrees out of phase from the left side racks 36, 40. More preferably, the right side racks 34, 38 are driven such that they are 80 degrees out of phase from the left side racks 36, 40. It will be understood that a variety of other phase differences may be employed. Further, a variety of other actuators and drivers of the racks may also be utilized.

In accordance with one embodiment, each of the right side racks 34, 38 and the left side racks 36, 40 have the same length. To achieve the offset, one of the rows of racks 30, 32 is moved laterally. As shown in FIGS. 2 and 3, the rear row of racks 32 is moved to the left and secured to the overhead support structure 18 in this fashion. For example, the outer edge 60 of the left side rack 36 is disposed further to the left than the outer edge 62 of the left side rack 40. Similarly, the outer edge 64 of the right side rack 38 is disposed further to the right than the outer edge 66 of the right side rack 34. This configuration provides increased vehicle coverage with the same size racks. It will be understood that it is not important which row of racks is shifted or in which direction they are shifted. In an alternative arrangement, the individual racks can have different lengths. With racks of different lengths, the racks just need to be configured such that the gaps therebetween are laterally offset from one another to eliminate any gaps in cleaning coverage.

In operation, the right side racks 34, 38 reciprocate forwardly to allow the elongated cloth strips 42 to contact the exterior surface of the vehicle. They contact the portions of the vehicle that correspond to the footprint of the rack to which the cloth strips 42 are attached. As the right side racks 34, 38 move rearwardly, the left side racks 36, 40 move forwardly. The right side rack 34 and the left side rack 36 of the front row of racks 30 would not cover an area of the exterior of the vehicle that corresponds to or passes under the front gap 50. Similarly, the right side rack 38 and the left side rack 40 of the rear row of racks 32 would not cover an area of the exterior of the vehicle that corresponds to or passes under the rear gap 52. However, because the front gap 50 is offset laterally (perpendicular to the direction of travel of the vehicle) from the rear gap 52, the rear row of racks 32 contact any portion of the vehicle not contacted by the front row of racks 30 due to the presence of the overlapping gaps 50, 52. Similarly, because of the lateral offset between the gaps 50, 52, the portion of the vehicle that is not contacted by the rear rows of racks 32 due to the presence of the rear gap 52 is contacted by the front rows of racks 30. The offset of the gaps thus provides increased coverage for the exterior of the vehicle and ensures that any areas of non-coverage resulting from gaps or spaced between side-by-side racks is eliminated.

In accordance with another embodiment shown in FIG. 6, the rear row of racks 32 has the same configuration as set forth in FIGS. 1 through 5. However, the front row 30 consists of a single rack 70. The single front rack 70 is positioned so that it covers any area of non-cleaning coverage created by the rear gap 52. It will be understood that the rows of racks can take on a variety of different configurations. It will be understood by one of ordinary skill in the art that the rear row can consist of a single rack, while the front rows consists of a pair of racks.

It will be understood that more than two rows of racks may be utilized as desired. It will also be understood by one of ordinary skill in the art that any row can include more than a right side rack and a left side rack or can include only a single rack. For example, the front and rear rows could each consist of a left side rack, a middle rack, and a right side rack.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An overhead car wash mitter assembly designed for use in a vehicle wash system, the assembly comprising:
   an overhead supporting structure;
   a first row containing at least a left side rack and a right side rack, a plurality of media secured to and extending downwardly from each of said left side rack and said right side rack to form mitter curtain assemblies that are intended to contact an exterior of the vehicle;
   a second row containing at least one rack, a plurality of media secured to and extending downwardly from said at least one rack to form a mitter curtain assembly that is intended to contact said exterior of the vehicle;
   a first gap being located between said left side rack and said right said rack of said first row;
   said at least one rack in said second row is configured such that said plurality of media cover any untreated area of said exterior of the vehicle resulting from said first gap in said first row;
   wherein said first row and said second row are reciprocated in a generally forward and rearward direction with respect to a direction of travel of the vehicle.

2. The assembly of claim 1, wherein said first row is located forwardly of said second row.

3. The assembly of claim 1, wherein said first row is located rearwardly of said second row.

4. The assembly of claim 1, wherein said second row includes a left side rack and a right side rack and wherein a second gap is located between said left side rack and said right side rack in said second row.

5. The assembly of claim 4, wherein said second gap in said second row is offset from said first gap in said first row in a direction perpendicular to said direction of travel of the vehicle to eliminate any break in the cleaning coverage.

6. The assembly of claim 5, wherein said right side racks move together and said left side racks move together and wherein said right side racks are independently driven from said left side racks.

7. The assembly of claim 6, further comprising:
   an actuator for reciprocating said right side racks and said left side racks forwardly and rearwardly such that said right side racks are phased with respect to said left side racks such that said racks do not collide.

8. The assembly of claim 7, wherein said actuator is in communication with a pitman arm to control movement of said racks.

9. The assembly of claim 8, wherein said right side racks and said left side racks are between 70 and 90 degrees out of phase from each other.

10. The assembly of claim 5, wherein said right side rack and said left side rack in said first row are the same length as said right side rack and said left side rack in said second row such that one of said first row or said second row extends further in a lateral direction than the other of said rows to provide an increased area of cleaning coverage for said exterior of the vehicle.

11. An overhead car wash mitter assembly designed for use in a vehicle wash system, the assembly comprising:
    an overhead supporting structure;
    a plurality of rows of racks, each row of racks including a left side rack and a right side rack;
    said left side racks being moveable together and said right side racks being moveable together, said left side racks being independently driven with respect to said right side racks;
    a plurality of media secured to and extending downwardly from each of said left side racks to form a plurality of left side mitter curtain assemblies and a plurality of media secured to and extending downwardly from each of said right side racks to form a plurality of right side mitter curtain assemblies;
    a first gap being formed between said left side mitter curtain assembly and said right side mitter curtain assembly in one of said plurality of rows of racks;
    a second gap being formed between said left side mitter curtain assembly and said right side mitter curtain assembly in another of said plurality of rows of racks;
    wherein said first gap is offset from said second gap to eliminate any gap in cleaning coverage.

12. The assembly of claim 11, further comprising:
    an actuator for reciprocating said left side mitter curtain assemblies and said right side mitter curtain assemblies forwardly and rearwardly with respect to a direction of travel of the vehicle, such that said reciprocation of said left side mitter assemblies is phased with respect to said reciprocation of said right side mitter assemblies such that said racks do not collide.

13. The assembly of claim 12, wherein said actuator is in communication with a pitman arm to control movement of said rows of racks.

14. The assembly of claim 13, wherein said left side mitter curtain assemblies are between 70 and 90 degrees out of phase from said right side mitter curtain assemblies.

15. The assembly of claim 13, wherein said left side mitter curtain assemblies are 80 degrees out of phase from said right side mitter curtains assemblies.

16. The assembly of claim 11, wherein said plurality of rows of racks are reciprocated in a generally arcuate fashion.

17. The assembly of claim 11, wherein said first gap and said second gap are generally parallel to each other.

18. The assembly of claim 11, wherein each row of said plurality of rows of racks have the same length such that one of said plurality of rows extends farther in a lateral direction than another of said plurality of rows to provide an increased area of coverage.

19. An overhead car wash mitter assembly designed for use in a vehicle wash system, the assembly comprising:
    an overhead supporting structure;
    a forward row of racks, including a left side rack and a right side rack;
    a rear row of racks, including a left side rack and a right side rack;

said forward and rear left side racks being moveable together and said forward and rear right side racks being moveable together, said forward and rear left side racks being independently driven with respect to said forward and rear right side racks;

a plurality of media secured to and extending downwardly from each of said left side racks to form a plurality of left side mitter curtain assemblies and a plurality of media secured to and extending downwardly from each of said right side racks to form a plurality of right side mitter curtain assemblies;

said forward left side mitter curtain assembly being spaced apart from said forward right side mitter curtain assembly such that a first gap is formed therebetween;

said rear left side mitter curtain assembly being spaced apart from said rear right side mitter curtain assembly such that a second gap is formed therebetween;

wherein said left side mitter curtain assemblies and said right side mitter curtain assemblies move forward and rearward in a direction generally parallel to a direction of travel of the vehicle to contact an exterior of the vehicle; and whereby said first gap is offset laterally from said second gap with respect to a direction of travel of the vehicle to eliminate any gap in cleaning coverage for said exterior of the vehicle.

20. The assembly of claim 19, further comprising:

an actuator for reciprocating said left side mitter curtain assemblies and said right side mitter curtain assemblies such that said left side mitter curtain assemblies and said right side mitter curtain assemblies are phased with respect to one another in a manner to prevent said racks from colliding.

21. The assembly of claim 20, wherein said actuator is in communication with a pitman arm that moves said right side mitter assemblies and said left side mitter assemblies with respect to one another.

22. The assembly of claim 20, wherein said right side mitter assemblies are between 70 and 90 degrees out of phase from said left side mitter assemblies.

23. The assembly of claim 22, wherein said right side mitter assemblies are 80 degrees out of phase from said left side mitter assemblies.

24. The assembly of claim 19, wherein each of said forward row and said rear row have the same length in a direction perpendicular to said direction of travel of the vehicle such that one of said forward row or said rear row extends farther in said perpendicular direction than the other of said forward row or said rear row to provide and increased area of coverage on said exterior of the vehicle.

25. An overhead car wash mitter assembly designed for use in a vehicle wash system, the assembly comprising:

a pair of side supports;

an overhead supporting structure extending generally between said pair of side supports;

a first row containing at least a left side rack and a right side rack, a plurality of media secured to and extending downwardly from each of said left side rack and said right side rack to form mitter curtain assemblies that are intended to contact an exterior of the vehicle;

said left side rack and said right side rack being secured to said overhead structure such that a gap is formed therebetween in said first row;

a second row containing at least one rack, a plurality of media secured to and extending downwardly from said at least one rack to from a mitter curtain assembly that is intended to contact said exterior of the vehicle;

said at least one rack in said second row overlapping said gap in said first row to cover any untreated area of an exterior of the vehicle resulting from said gap in said first row;

wherein said first row and said second row are reciprocated in a generally forward and rearward direction with respect to a direction of travel of the vehicle.

* * * * *